United States Patent
Burks et al.

(10) Patent No.: US 12,173,848 B2
(45) Date of Patent: Dec. 24, 2024

(54) COMPRESSED GAS CYLINDER GAS DENSITY MEASUREMENT

(71) Applicant: HEXAGON TECHNOLOGY AS, Alesund (NO)

(72) Inventors: Brian Burks, Parker, CO (US); John Eihusen, Lincoln, NE (US); Troy Otto, Aurora, CO (US)

(73) Assignee: HEXAGON TECHNOLOGY AS, Alesund (NO)

( * ) Notice: Subject to any disclaimer, the term of this patent is extended or adjusted under 35 U.S.C. 154(b) by 316 days.

(21) Appl. No.: 17/829,456

(22) Filed: Jun. 1, 2022

(65) Prior Publication Data

US 2023/0018389 A1 Jan. 19, 2023

Related U.S. Application Data

(60) Provisional application No. 63/221,907, filed on Jul. 14, 2021.

(51) Int. Cl.
*G01F 23/263* (2022.01)
*F17C 13/02* (2006.01)

(52) U.S. Cl.
CPC .......... *F17C 13/021* (2013.01); *G01F 23/266* (2013.01); *G01F 23/268* (2013.01);
(Continued)

(58) Field of Classification Search
CPC ............ F17C 13/021; F17C 2205/0311; F17C 2250/0417; F17C 2201/0109; F17C 2201/056; F17C 2201/058; F17C 2203/0604; F17C 2203/0619; F17C 2203/0639; F17C 2203/0643; F17C 2203/0646; F17C 2203/0648; F17C 2203/0663; F17C 2205/0305; F17C 2205/0323; F17C 2205/0394;
(Continued)

(56) References Cited

U.S. PATENT DOCUMENTS

| | | |
|---|---|---|
| 3,868,963 A | 3/1975 | Muellerpoths |
| 4,644,796 A | 2/1987 | Ward |

(Continued)

FOREIGN PATENT DOCUMENTS

| | | |
|---|---|---|
| CA | 2576582 | 8/2007 |
| CN | 102519562 B | 8/2015 |

(Continued)

OTHER PUBLICATIONS

International Search Report and Written Opinion for International Application No. PCT/US2022/031716, date of mailing Sep. 28, 2022, 11 pages.

(Continued)

*Primary Examiner* — Xin Y Zhong
(74) *Attorney, Agent, or Firm* — Westman, Champlin & Koehler P.A.

(57) ABSTRACT

A pressure vessel assembly incudes a pressure vessel and a gas density gauge. The pressure vessel includes a vessel wall defining an interior cavity. The gas density gauge includes a parallel plate capacitor having a pair of plates. Opposing surfaces of the plates are separated by a distance across an open gap. A capacitance of the capacitor is related to a density of a gas within the open gap.

14 Claims, 4 Drawing Sheets

(52) U.S. Cl.
CPC .......... *F17C 2205/0311* (2013.01); *F17C 2250/0417* (2013.01)

(58) Field of Classification Search
CPC ...... F17C 2209/2118; F17C 2209/2127; F17C 2221/011; F17C 2221/012; F17C 2221/014; F17C 2221/017; F17C 2221/033; F17C 2221/035; F17C 2223/0123; F17C 2223/0161; F17C 2223/036; F17C 2250/032; F17C 2250/034; F17C 2250/0421; F17C 2260/013; F17C 2260/024; F17C 2260/026; F17C 13/02; G01F 23/266; G01F 23/268; Y02E 60/32
See application file for complete search history.

(56) References Cited

U.S. PATENT DOCUMENTS

| | | | |
|---|---|---|---|
| 4,924,701 A * | 5/1990 | Delatorre | G01L 9/0075 361/283.4 |
| 5,429,845 A | 7/1995 | Newhouse et al. | |
| 5,476,189 A | 12/1995 | Duvall et al. | |
| 6,155,099 A | 12/2000 | Kobayashi et al. | |
| 6,584,825 B2 | 7/2003 | Pratt et al. | |
| 7,254,983 B2 | 8/2007 | DaCosta et al. | |
| 8,656,793 B2 | 2/2014 | McLean et al. | |
| 9,255,870 B2 | 2/2016 | Downie et al. | |
| 9,383,281 B2 | 7/2016 | Hashim et al. | |
| 9,581,297 B2 | 2/2017 | Downie et al. | |
| 10,113,893 B2 | 10/2018 | Behrens et al. | |
| 10,823,333 B2 | 11/2020 | Criel et al. | |
| 2013/0306650 A1 * | 11/2013 | Downie | G01G 17/04 137/551 |
| 2015/0128682 A1 | 5/2015 | Downie et al. | |

FOREIGN PATENT DOCUMENTS

| | | |
|---|---|---|
| DE | 10046102 A1 | 3/2002 |
| DE | 10109058 A1 | 9/2002 |
| FR | 2 692 352 A3 | 12/1993 |
| JP | 5311402 B2 | 10/2013 |
| WO | 2019070409 A1 | 4/2019 |

OTHER PUBLICATIONS

Https://www.electronicdesign.com/technologies/analog/article/21796004/use-analog-techniques-to-measure-capacitance-in-capacitive-sensors, Accessed Jun. 1, 2022.

Examiner's Report for Canadian Patent Application No. 3,165,975, dated Sep. 13, 2023, 3 pages.

Office Action dated Jul. 2, 2024, for corresponding CA Patent Application No. 3,165,975, filed Jun. 29, 2022.

* cited by examiner

COMPRESSED GAS CYLINDER GAS DENSITY MEASUREMENT

CROSS-REFERENCE TO RELATED APPLICATION

This application claims the benefit of priority from U.S. Provisional Patent Application No. 63/221,907, filed Jul. 14, 2021, by Hexagon Technology AS for "Compressed Gas Cylinder Gas Density Measurement"; this priority application is hereby incorporated by reference in its entirety.

BACKGROUND

Pressure vessels are commonly used for containing a variety of fluids under pressure, such as hydrogen, oxygen, nitrogen, propane, methane and other fuels, for example. Generally, pressure vessels can be of any size or configuration. The vessels can be heavy or light, single-use (e.g., disposable), reusable, subjected to high pressures (greater than 50 pounds per square inch (psi) (344,738 pascal), for example), low pressures (less than 50 psi or 344,738 pascal, for example), or used for storing fluids at elevated or cryogenic temperatures, for example.

Suitable pressure vessel shell materials include metals, such as steel; or composites, which may include laminated layers of wound fiberglass filaments or other synthetic filaments bonded together by a thermal-setting or thermoplastic resin. The fiber may be fiberglass, aramid, carbon, graphite, or any other generally known fibrous reinforcing material. The resin material used may be epoxy, polyester, vinyl ester, thermoplastic, or any other suitable resinous material capable of providing fiber-to-fiber bonding, fiber layer-to-layer bonding, and the fragmentation resistance required for the particular application in which the vessel is to be used. The composite construction of the vessels provides numerous advantages such as lightness in weight and resistance to corrosion, fatigue and catastrophic failure. These attributes are due to the high specific strengths of the reinforcing fibers or filaments.

A polymeric or other non-metallic resilient liner or bladder is often disposed within a composite shell to seal the vessel and prevent internal fluids from contacting the composite material. The liner can be manufactured by compression molding, blow molding, injection molding, or any other generally known technique. Alternatively, the liner can be made of other materials, including steel, aluminum, nickel, titanium, platinum, gold, silver, stainless steel, and any alloys thereof. Such materials can be generally characterized as having a high modulus of elasticity. In one embodiment, a liner is formed of blow molded high density polyethylene (HDPE).

FIG. 1 illustrates an elongated pressure vessel 10 in accordance with the prior art, such as that disclosed in U.S. Pat. No. 5,476,189, entitled "Pressure vessel with damage mitigating system," and International Application Publication Number WO 2019/070409, entitled "Pressure Indicator," each of which is hereby incorporated by reference. FIG. 2 illustrates a partial cross-sectional view, taken along line 2-2 of FIG. 1, and illustrates features, such as those disclosed in U.S. Pat. No. 5,429,845, entitled "Boss for a filament wound pressure vessel," which is hereby incorporated by reference.

Pressure vessel 10 has a main body section 12 and substantially hemispherical or dome-shaped end sections 14. A boss 16, typically constructed of aluminum, is provided at one or both ends of the pressure vessel 10 to provide a port for communication between the interior environment or cavity 17 of the pressure vessel 10 and the exterior environment 19. As shown in FIG. 2, the pressure vessel 10 has a vessel wall 15 formed with a liner 20 (such as an inner polymer liner) covered by a shell 18. In one example, the shell 18 can be a filament-wound composite shell. The shell 18 resolves structural loads on the pressure vessel 10, while the liner 20 provides a gas barrier.

The boss 16 may include a neck 22 having an exterior surface 23 and a port 26. The port 26 generally traverses the exterior surface 23 of the boss 16 and allows fluid communication between the exterior environment 19 and the interior environment 17 of pressure vessel 10. The boss 16 may also include a flange 24 (depicted as an annular flange) extending radially outward from the neck 22. The flange 24 may be contained between portions of the liner 20 and/or sandwiched between the liner 20 and the shell 18. This construction secures the boss 16 to the pressure vessel 10 and provides a seal at an interface between the boss 16 and the liner 20.

It is often desirable to know the amount of gas (e.g., specific density, or weight) contained within the known volume of the interior cavity 17 of the pressure vessel, such as when attempting to fill the pressure vessel with a particular volume of gas, or when estimating when the pressure vessel will require refilling.

One technique that may be used to measure the amount of a gas contained in the pressure vessel based on the interior pressure. Pressure measurement devices that are suitable for this purpose are widely available.

One issue with estimating the amount of the gas in the pressure vessel based on a pressure measurement, is that the pressure measurement is dependent on the temperature. This may be easily accommodated when the temperature of the gas within the pressure vessel is at a steady temperature. However, during filling of the pressure vessel with the gas, the temperature within the vessel is highly variable due to gas stratification and turbulent mixing, making it extremely difficult to accurately gauge the amount of gas within the pressure vessel from moment to moment.

SUMMARY

Embodiments of the present disclosure relate to devices, pressure vessel assemblies, systems and methods for measuring a density of a gas contained in an interior cavity of a pressure vessel, insensitive to the temperature of the gas. One device is a pressure vessel plug that is configured to seal a port of a boss of a pressure vessel. The plug includes a plug body that is configured to be received within the port, and a gas density gauge. The gas density gauge includes a parallel plate capacitor supported by the plug body. The capacitor includes a pair of plates having opposing surfaces that are separated by a distance across an open gap. A capacitance of the capacitor is related to a density of a gas within the open gap.

One example of the pressure vessel assembly incudes a pressure vessel and a gas density gauge. The pressure vessel includes a vessel wall defining an interior cavity. The gas density gauge includes a parallel plate capacitor having a pair of plates. Opposing surfaces of the plates are separated by a distance across an open gap. A capacitance of the capacitor is related to a density of a gas within the open gap.

One example of a system for measuring a density of a gas within a pressure vessel includes a pressure vessel assembly, and capacitance measurement circuitry. The assembly includes a pressure vessel and a gas density gauge. The pressure vessel includes a vessel wall defining an interior cavity. The gas density gauge includes a parallel plate capacitor having a pair of plates that are separated by a fixed distance across an open gap. The opposing surfaces and the gap are exposed to a gas within the interior cavity. The capacitance measurement circuitry is configured to generate a capacitance signal relating to a capacitance of the capacitor and to a density of a gas within the interior cavity.

In one example of a method of measuring a density of a gas within a pressure vessel, a gas is contained within an interior cavity of the pressure vessel defined by a vessel wall. A gap between a pair of plates of a parallel plate capacitor is exposed to the interior cavity. A capacitance signal is generated indicating a capacitance of the capacitor using capacitance measurement circuitry. The capacitance signal is related to a density of the gas.

This disclosure, in its various combinations, either in apparatus or method form, may also be characterized by the following listing of items:

1. A pressure vessel plug configured to seal a port of a boss of a pressure vessel, the plug comprising:
   a plug body configured to be received within the port; and
   a gas density gauge comprising a parallel plate capacitor supported by the plug body and including a pair of plates having opposing surfaces that are separated by a distance across an open gap,
   wherein a capacitance of the capacitor is related to a density of a gas within the open gap.
2. The plug according to claim 1, wherein:
   the plug body includes a proximal end and a distal end that is exposed to an interior cavity of the pressure vessel when the plug body is received within the port; and
   the capacitor is supported at the distal end.
3. The plug according to claim 2, wherein the gas density gauge includes a terminal block at the proximal end having a pair of terminals, each of the terminals is connected to one of the plates through a conductive path.
4. The plug according to claim 1, wherein the plug includes valving through which a gas may be injected into the interior cavity or discharged from the interior cavity.
5. A pressure vessel assembly comprising:
   a pressure vessel including a vessel wall defining an interior cavity; and
   a gas density gauge comprising a parallel plate capacitor including a pair of plates that are separated by a distance across an open gap,
   wherein:
   the opposing surfaces and the gap are exposed to a gas within the interior cavity; and
   a capacitance of the capacitor is related to a density of the gas.
6. The assembly according to claim 5, including:
   a boss supported by the vessel wall and including a port to the interior cavity; and
   a plug comprising a plug body received within the port, wherein the parallel plate capacitor is supported by the plug.
7. The assembly according to claim 6, wherein:
   the plug body includes a proximal end, and a distal end, which is exposed to the interior cavity; and
   the capacitor is supported at the distal end.
8. The assembly according to claim 7, wherein the gas density gauge includes a terminal block at the proximal end having a pair of terminals, each of the terminals is connected to one of the plates.
9. The assembly according to claim 5, wherein the plug includes valving through which a gas may be injected into the interior cavity or discharged from the interior cavity.
10. The assembly according to claim 5, including capacitance measurement circuitry configured to generate a capacitance signal relating to the capacitance of the capacitor and to the density of the gas.
11. The assembly according to claim 10, wherein:
   a first of the plates is connected to electrical ground; and
   the capacitance measurement circuitry comprises a timer circuit coupled to a second of the plates and configured to output the capacitance signal having a frequency that is related to the capacitance.
12. The assembly according to claim 10, wherein the capacitance measurement circuitry includes a controller configured to:
   determine the capacitance of the capacitor based on the capacitance signal;
   calculate a dielectric constant of the gas based on the capacitance, a distance separating the opposing surfaces, a surface area of the opposing surfaces, and the permittivity of free space;
   determine a density of the gas based on the dielectric constant and a relationship between the dielectric constant of the gas and the density of the gas; and
   generate a signal representing a value that is related to the density of the gas.
13. The assembly according to claim 10, including:
   a boss supported by the vessel wall and including a port to the interior cavity; and
   a plug comprising a plug body received within the port, wherein the parallel plate capacitor is supported by the plug body.
14. The assembly according to claim 13, wherein:
   the plug body includes a proximal end and a distal end, which is exposed to the interior cavity; and
   the capacitor is supported at the distal end.
15. The assembly according to claim 14, wherein the gas density gauge includes a terminal block at the proximal end having a pair of terminals, each of the terminals is connected to the capacitance measurement circuitry and to one of the plates.
16. The assembly according to claim 13, wherein the plug includes valving through which a gas may be injected into the interior cavity or discharged from the interior cavity.
17. A method of measuring a density of a gas within a pressure vessel comprising:
   containing a gas within an interior cavity of the pressure vessel defined by a vessel wall;
   exposing a gap between a pair of plates of a parallel plate capacitor to the interior cavity; and
   generating a capacitance signal indicating a capacitance of the capacitor using capacitance measurement circuitry,
   wherein the capacitance signal is related to a density of the gas.
18. The method according to claim 17, wherein:
   the pressure vessel includes a boss supported by the vessel wall and having a port to the interior cavity;
   the method includes:
   providing a plug having a plug body; and
   sealing the port comprising receiving the plug body within the port; and
   the parallel plate capacitor is supported by the plug body.
19. The method according to claim 17, including:
   connecting a first of the plates to electrical ground;
   connecting a second of the plates to a timer circuit of the capacitance measurement circuitry; and
   generating the capacitance signal using the timer circuit, the capacitance signal having a frequency that is related to the capacitance.

20. The method according to claim 17, including processing steps performed using a controller including:

determining the capacitance of the capacitor based on the capacitance signal;

calculating a dielectric constant of the gas based on the capacitance, a distance separating the opposing surfaces, a surface area of the opposing surfaces, and the permittivity of free space;

determining a density of the gas based on the dielectric constant and a relationship between the dielectric constant of the gas and the density of the gas; and generating a signal representing a value that is related to the density of the gas.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Specifically, features disclosed herein with respect to one embodiment may be equally applicable to another. Further, this Summary is not intended to be used as an aid in determining the scope of the claimed subject matter. Many other novel advantages, features, and relationships will become apparent as this description proceeds. The figures and the description that follow more particularly exemplify illustrative embodiments.

Figure 1:
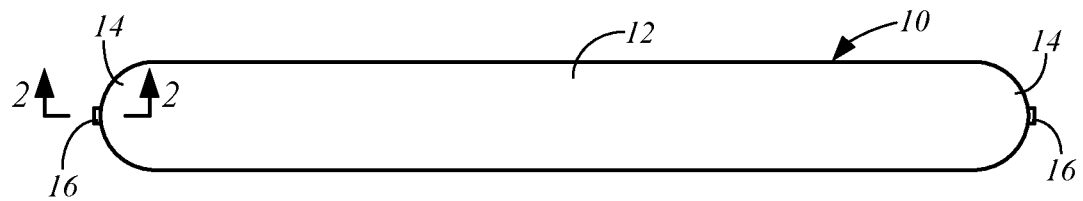
FIG. 1 is a side view of an example of a conventional pressure vessel.

While the above-identified figures set forth one or more embodiments of the disclosed subject matter, other embodiments are also contemplated, as noted in the disclosure. In all cases, this disclosure presents the disclosed subject matter by way of representation and not limitation. It should be understood that numerous other modifications and embodiments can be devised by those skilled in the art that fall within the scope of the principles of this disclosure.

The figures may not be drawn to scale. In particular, some features may be enlarged relative to other features for clarity. Moreover, where terms such as above, below, over, under, top, bottom, side, right, left, vertical, horizontal, etc., are used, it is to be understood that they are used only for ease of understanding the description. It is contemplated that structures may be oriented otherwise.

DETAILED DESCRIPTION OF ILLUSTRATIVE EMBODIMENTS

Embodiments of the present disclosure are described more fully hereinafter with reference to the accompanying drawings. Elements that are identified using the same or similar reference characters refer to the same or similar elements. The various embodiments of the present disclosure may, however, be embodied in many different forms and should not be construed as limited to the embodiments set forth herein. Rather, these embodiments are provided so that this disclosure will be thorough and complete, and will fully convey the scope of the present disclosure to those skilled in the art.

In the compressed gas industry, an issue arises in the ability to completely fill cylinders or pressure vessels due to the temperature-pressure dependence which exists for compressed gasses. Most jurisdictions in the world allow for high pressure cylinders or vessels to be filled to a given pressure at a defined temperature. A more effective way to fill pressure vessels would be where the cylinder is filled to a weight. For many pressure vessel applications, (e.g., vessels that are mounted into an automobile, trailer, etc.) filling the vessel to a weight is not feasible or cost effective.

Embodiments of the present disclosure relate to devices, pressure vessel assemblies, systems and methods for measuring a density of a gas contained in an interior cavity 17 of a pressure vessel 10 in a manner that is substantially insensitive to the temperature of the gas. These embodiments can be used to fill pressure vessels to a weight when they could not otherwise be filled in such a fashion. Accordingly, embodiments of the present disclosure provide wide ranging benefits including allowing fuel gauges in automobiles to more accurately know the amount of energy available in the fuel container (pressure vessel), as opposed to solely relying on pressure estimates, and enabling for the safe and accurate filling of pressure vessels to their full capacity.

Figure 3:
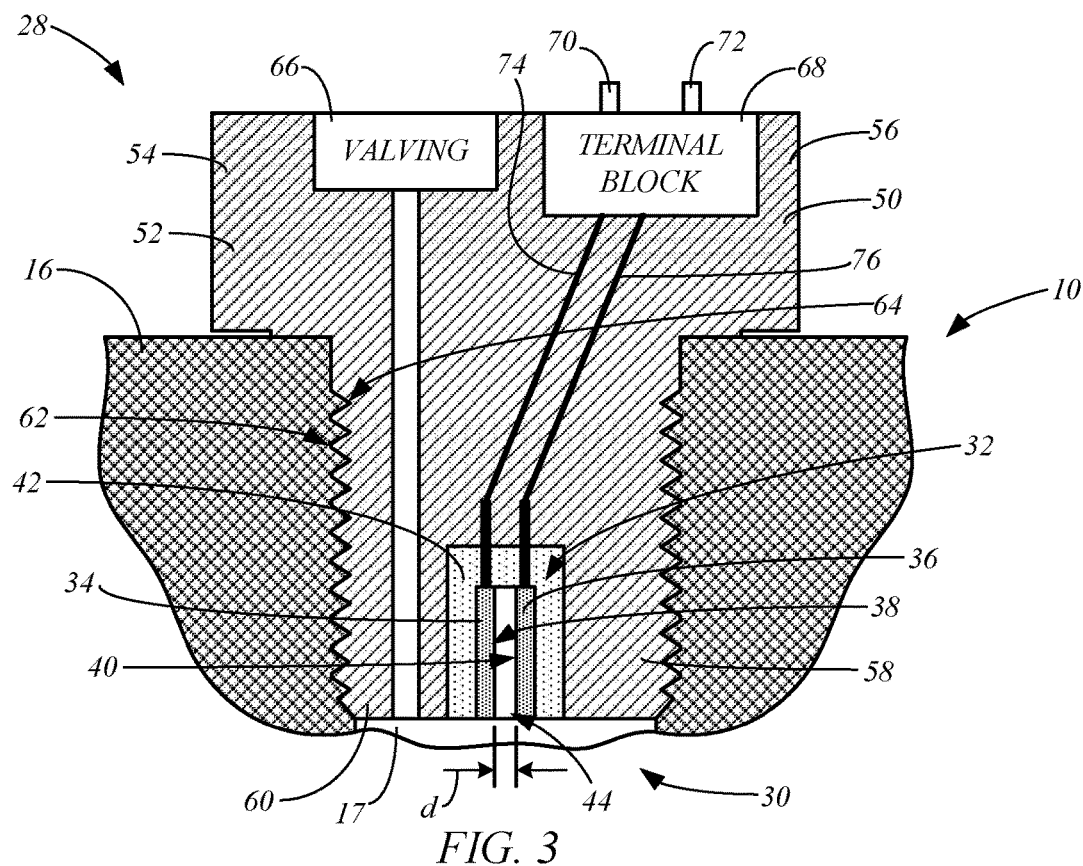
FIG. 3 is a simplified cross-sectional view of a pressure vessel assembly, in accordance with embodiments of the present disclosure.

FIG. 3 is a simplified cross-sectional view of a pressure vessel assembly 28, in accordance with embodiments of the present disclosure. The assembly 28 generally includes a gas density gauge 30 and a pressure vessel 10. The gauge 30 includes a parallel plate capacitor 32 having a pair of parallel plates 34 and 36. The plates 34 and 36 have opposing surfaces 38 and 40 that are separated from each other by a distance d and have generally matching surface areas. The distance d may be substantially fixed. However, the distance d may vary due to deformation of the plates 34 and 36. In general, the distance d a known parameter, which may be determined using suitable techniques. The plates 34 and 36 may be supported in a suitable electrically insulating material 42, such as, for example, polyoxymethylene (POM), Polyetheretherketone (PEEK), and/or another suitable dielectric or electrically insulative material, that electrically isolates non-exposed portions of the plates 34 and 36 from the surrounding material, and fixes the relative positions of the plates 34 and 36.

A gap 44 corresponding to the separation distance d extends between the surfaces 38 and 40 of the plates 34 and 36. The capacitor 32 is supported such that the gap 44 is open to the interior cavity 17 of the pressure vessel 10. Thus, the gas within the interior cavity 17 of the pressure vessel 10 fills the gap 44, and acts as a dielectric to the capacitor 32. As discussed below, there is a relationship between the dielectric constant (and therefore the capacitance of the capacitor 32) and the density of the gas contained in the interior cavity 17. Thus, the capacitance measured using the gauge 30 may be used to determine the density of the gas and the amount of the gas contained in the interior cavity 17.

The gauge 30 of the assembly 28 may be supported in any suitable manner, such that the gap 44 is open to the interior cavity 17 of the pressure vessel 10. In one embodiment, the gauge 30 is supported by a wall 15 (FIG. 2) of the pressure vessel 10. In a more specific example, the capacitor 32 is attached to a plug 50, which may be supported by a wall of the pressure vessel 10 through a boss 16, as shown in FIG. 3.

The plug 50 may take on any suitable form, and may operate to seal a boss 16 of the pressure vessel, as indicated in FIG. 3. Conventional sealing components, such as O-rings are not shown to simplify the drawing. The plug 50 may include a plug body 52 having a shoulder portion 54 at a proximal end 56, and a cylinder portion 58 extending to a distal end 60. The cylinder portion 58 is configured to be received within the boss 16, and may include a threaded exterior surface 62 that cooperates with a threaded interior surface 64 of the boss 16 to secure the plug 50 to the boss 16. Other conventional techniques for securing the plug 50 to the boss 16 may also be used.

In some embodiments, the plug 50 includes conventional valving 66, which may facilitate gas egress and ingress from and to the interior cavity 17 of the pressure vessel 10.

In one embodiment, the capacitor 32 is supported at the distal end 60 of the plug body 52 with the gap 44 exposed to the interior cavity 17, as shown in FIG. 3. Alternatively, the capacitor 32 may be supported at a more interior location of the plug body 52, provided that an open pathway to the interior cavity 17 extends to the gap 44.

In one embodiment, the gauge 30 includes a terminal block 68 at the proximal end 56 of the plug body 52. The terminal block 68 may include terminals 70 and 72 that are respectively connected to the plates 34 and 36 through suitable conductors 74 and 76. In one alternative, the gas density gauge 30 may be configured to wirelessly transmit the capacitance of the capacitor 32 to external circuitry for processing.

Figure 4:
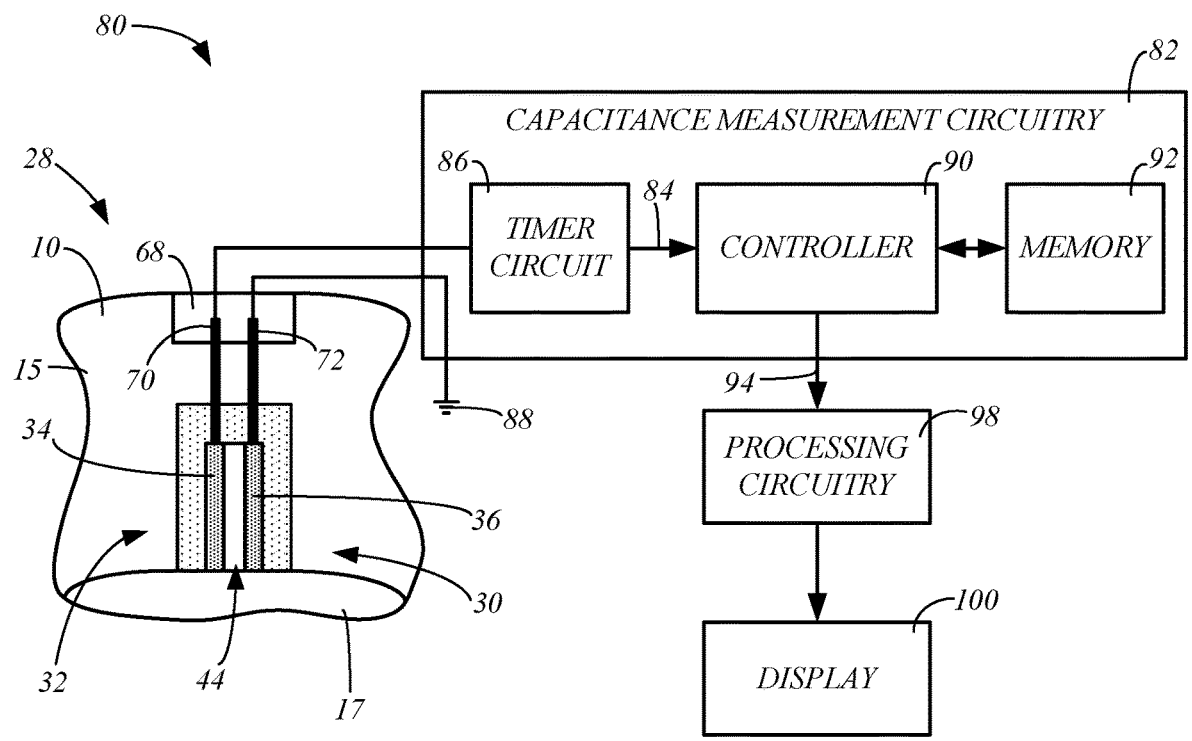
FIG. 4 is a simplified diagram of a system for measuring a density of a gas within a pressure vessel, in accordance with embodiments of the present disclosure.

FIG. 4 is a simplified block diagram of a system 80 for measuring a density of a gas within the interior of a pressure vessel, in accordance with embodiments of the present disclosure. The system 80 may include a pressure vessel assembly 28 formed in accordance with one or more embodiments disclosed herein, and capacitance measurement circuitry 82. As discussed above, embodiments of the assembly 28 generally include a pressure vessel 10 and a gas density gauge 30 supported by a wall 15 of the vessel 10, as shown in FIG. 4. This includes the configuration of FIG. 3, in which the gauge 30 is supported by a plug 50, which in turn is supported by a boss 16 attached to a wall 15 of the pressure vessel 10.

The capacitance measurement circuitry 82 is connected to the capacitor 32, such as through the terminal block 68 of the gauge 30, and is configured to measure (e.g., sensor or detect) the capacitance ($C_{MEAS}$) of the capacitor 32, and produce a capacitance signal 84 that is indicative of or relates to the measured capacitance of the capacitor 32.

In one embodiment, the circuitry 82 includes a controller 90 that is configured to calculate a dielectric constant of the gas within the interior cavity 17 based on the capacitance signal, and determine the density of the gas based on the dielectric constant. As discussed below, for some gasses, this calculation of the amount of the gas within the vessel 10 may be performed independent of the temperature of the gas.

The controller 90 may represent one or more processors (e.g., a central processing unit) that control components of the circuitry 82 and/or process signals, such as the capacitance signal 84, to perform one or more functions described herein, such as the determination or calculation of the density of the gas within the vessel 10, for example. The controller 90 performs these control functions in response to the execution of instructions, which may be stored in memory 92 that represents local and/or remote memory or computer readable media. Such memory 92 comprises any suitable patent subject matter eligible computer readable media that do not include transitory waves or signals such as, for example, hard disks, CD-ROMs, optical storage devices, and/or magnetic storage devices. The one or more processors of the controller 90 may be components of one or more computer-based systems, and may include one or more control circuits, microprocessor-based engine control systems, and/or one or more programmable hardware components, such as a field programmable gate array (FPGA), for example. One suitable controller 90 is an ARM7 32-bit Reduced Instruction Set Computer (RISC) microcontroller, or similar controller.

The controller 90 may calculate the dielectric constant κ of the gas within the interior cavity 17 using Eq. 1 provided below.

$$\kappa = \frac{C_{MEAS} d}{A \varepsilon_0} \qquad \text{Eq. 1}$$

where d is the distance between the plates 34 and 36, A is the cross-sectional area between the plates (e.g., area of the surfaces 38 and 40), and $\varepsilon_0$ is the permittivity of free space. Accordingly, the controller 90 calculates the dielectric constant of the gas based on the measured or detected capacitance indicated by the capacitance signal, and the known geometry of the capacitor 32 using Eq. 1.

Furthermore, there is a known relationship between the dielectric of a gas and its density. Thus, when the interior cavity 17 of the pressure vessel 10 is filled with a known gas, the dielectric constant calculated by the controller 90 may be used to determine the corresponding density of the gas based on a mapping of the dielectric constant of the gas to a corresponding density, which may be contained in memory 92 of the circuitry 82. The determined density of the gas may then be used to calculate a weight or mass of the gas within the interior cavity 17 of the pressure vessel 10 based upon the volume of the interior cavity 17, using the controller 90 or another computing device.

Figure 5:
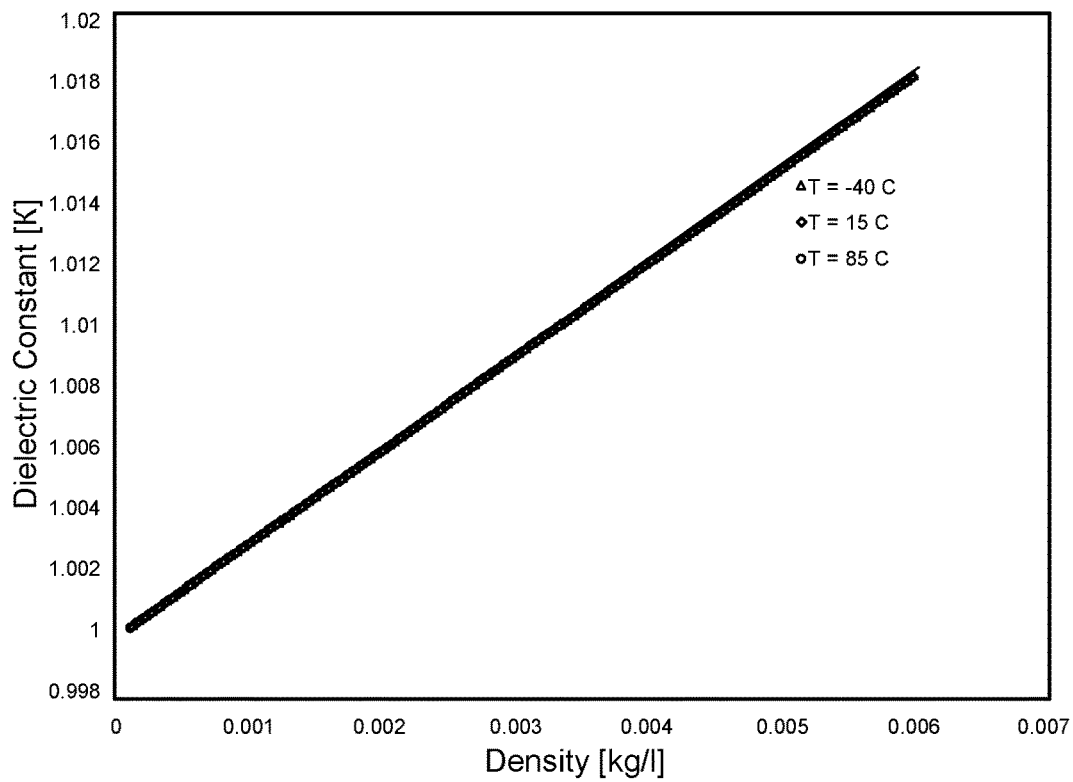
FIG. 5 is a chart illustrating a relationship between the dielectric constant of hydrogen gas taken at various temperatures, and the density of the gas.

In some embodiments, hydrogen gas ($H_2$) is contained in the interior cavity 17 of the pressure vessel 10, and the memory 92 contains a mapping of a relationship of a dielectric constant of hydrogen gas to a corresponding density. FIG. 5 is a chart illustrating such a relationship, where the dielectric constant of hydrogen gas is taken at various temperatures. As indicated by the chart, the dielectric constant of hydrogen gas is substantially independent of temperature over a wide range of operating temperatures for the process vessel 10 (e.g., −40-85° C.). As a result, the density measurement in accordance with the present disclosure may be useful for determining the density of hydrogen gas contained in the cavity 17 of the pressure vessel 10. Accordingly, the density of hydrogen or another gas contained in the interior cavity 17 whose dielectric constant is substantially independent of temperature over a range of operating temperatures of the vessel 10 may be determined by the controller 90 without having to provide temperature compensation through the use of a temperature sensor.

In one embodiment, the controller 90 outputs a signal 94 that represents a value that is related to the determined density of the gas within the interior cavity 17. Thus, the value represented by the signal 94 may directly represent the density of the gas. Alternatively, the controller 90 may process the determined density and produce a signal 94 representing the mass or weight of the gas contained in the cavity 17 based on the density and the known volume of the interior cavity 17.

The circuitry 82 may generate the capacitance signal 84 using any suitable technique. In one example, the circuitry 82 includes a timer circuit 86, and the circuitry 82 connects plate 36, to electrical ground or electrical common 88 of the circuitry 82, as indicated in FIG. 4. In one embodiment, the timer circuit 86 is configured to output the capacitance signal 84 having a frequency that indicates or is related to the capacitance of the capacitor 32.

Figure 6:
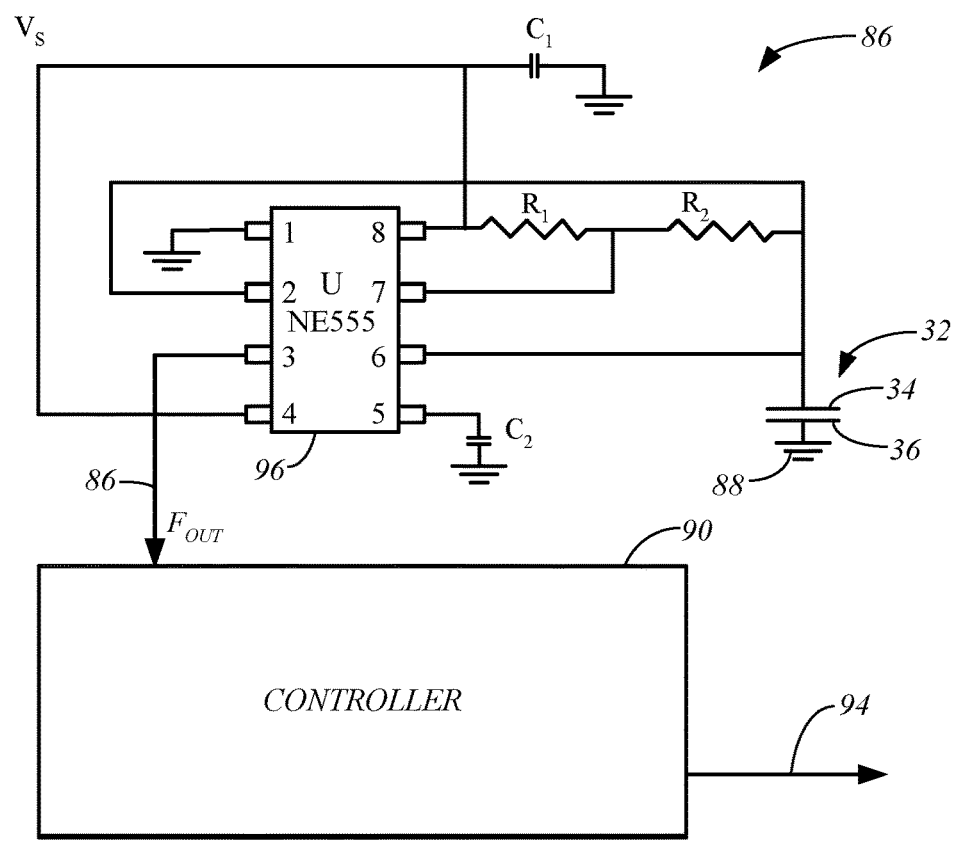
FIG. 6 is a diagram of capacitance measurement circuitry, in accordance with embodiments of the present disclosure.

FIG. 6 is a schematic diagram of the capacitance measurement circuitry 82 including an example of the timer circuit 86, in accordance with embodiments of the present disclosure. In one example, the timer circuit 86 includes an NE555 timer integrated circuit chip 96, or similar component. For the configuration of the timer circuit 86 shown in FIG. 6, $C_{MEAS}$ at pin 6 of the chip 96 may be calculated by the controller 90 using Eq. 2, where $f_{OUT}$ is the frequency of the pulses of the capacitance signal 86 output from the chip 96 at pin 3.

$$C_{MEAS} = \frac{1}{(f_{OUT} \cdot (R_1 + 2R_2) \cdot \ln 2)} \quad \text{Eq. 2}$$

After calculating or determining the capacitance $C_{MEAS}$ of the capacitor 32 using Eq. 2, the controller calculates the dielectric constant using Eq. 1. The controller 90 can then determine the density of the gas within the interior cavity 17 based on the dielectric constant and a relationship between the dielectric constant and the density of the gas (e.g., FIG. 5), using a suitable mapping stored in the memory 92, such as a look-up table. The controller 90 may then generate the density signal 94 representing the density of the gas.

Additional processing circuitry 98 representing one or more processors or computing devices may be used to further process the density signal 94, such as calculating the weight of the gas within the interior cavity 17 based on the density value represented by the signal 94 and a known volume of the interior cavity 17, for example. In some embodiments, processing circuitry 98 presents the density value of the gas, the weight of the gas, and/or other information a user of the system 80 on a display 100, as indicated in FIG. 4. The presented information may assist the user in filling the interior cavity 17 of the pressure vessel 10 with a selected gas to a desired density or weight.

Figure 2:
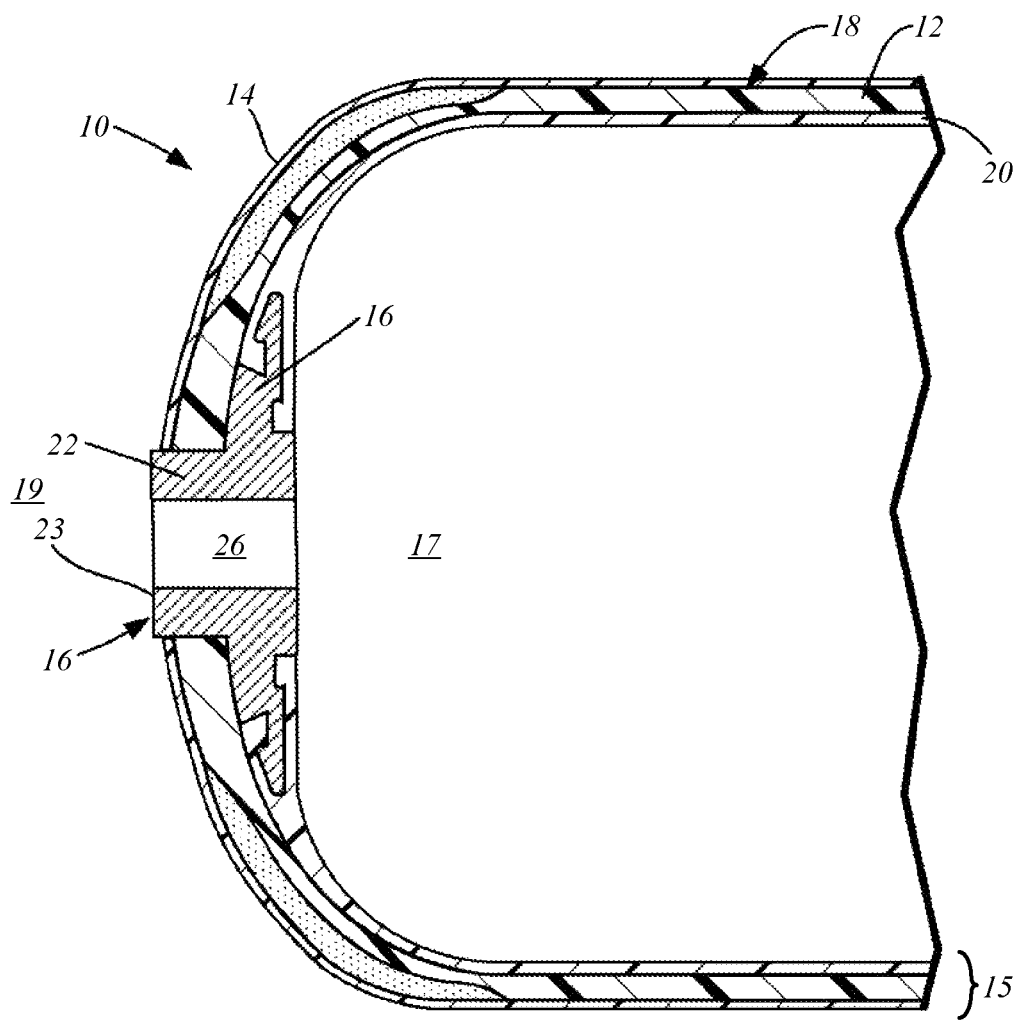
FIG. 2 is a partial cross-sectional view of one end of the pressure vessel of FIG. 1, taken along line 2-2 of FIG. 1 and showing an example of a typical boss, liner and shell.
Figure 7:
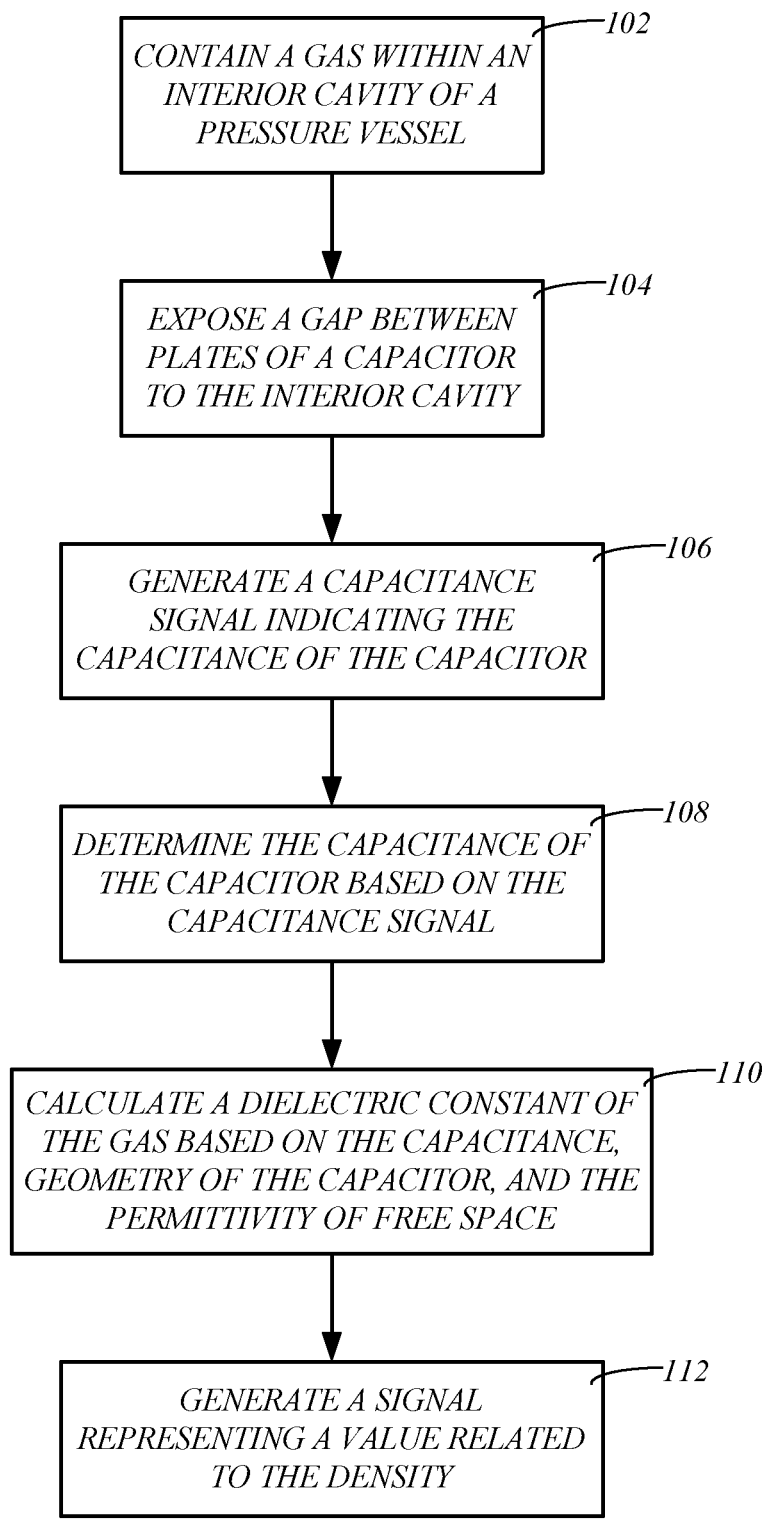
FIG. 7 is a flowchart illustrating a method of measuring a density of a gas within a pressure vessel, in accordance with embodiments of the present disclosure.

FIG. 7 is a flowchart illustrating a method of measuring a density of a gas within an interior cavity 17 of a pressure vessel 10, in accordance with embodiments of the present disclosure. At 102 of the method, a gas is contained within an interior cavity 17 of a pressure vessel 10 defined by a vessel wall 15 (FIGS. 1 and 2). At 104, a gap 44 between a pair of plates 34 and 36 of a parallel plate capacitor 32 is exposed to the interior cavity, such as shown in FIGS. 3 and 4. A capacitance signal 84, which indicates or represents a value of the capacitance of the capacitor 32, is generated at 106 of the method using capacitance measurement circuitry 82 (FIG. 4), in accordance with the techniques described herein.

As discussed above, the measured capacitance is related to a density of the gas. In some embodiments of the method, a controller 90 determines or calculates the capacitance of the capacitor 32 based on the capacitance signal 84, as indicated at 108, such as using Eq. 2 discussed above. In one embodiment, the controller 90 calculates a dielectric constant of the gas based on the capacitance, a distance d separating the plates 34 and 36, a surface area of the opposing surfaces 38 and 40 of the plates 34 and 36, and the permittivity of free space, as discussed above, as indicated at 110 of the method. At 112, the controller 90 may then determine a density of the gas based on the dielectric constant and a relationship between the dielectric constant and the density of the gas, and generate, at 114, a signal 94 representing a value that is related to the density of the gas.

Although the embodiments of the present disclosure have been described with reference to preferred embodiments, workers skilled in the art will recognize that changes may be made in form and detail without departing from the spirit and scope of the present disclosure.

What is claimed is:

1. A pressure vessel plug configured to seal a port of a boss of a pressure vessel, the plug comprising:
   a plug body configured to be received within the port;
   a gas density gauge comprising a parallel plate capacitor supported by the plug body and including a pair of plates having opposing surfaces that are separated by a distance across an open gap; and
   valving configured to control gas injection or discharge through the plug body,
   wherein:
   a first pathway extends from a first opening in a distal face of the plug body to the open gap;
   a second pathway extends from a second opening in the distal face to the valving; and
   a capacitance of the capacitor is related to a density of a gas within the open gap.

2. The plug according to claim 1, wherein:
   the plug body includes a proximal end and a distal end, which includes the distal face and is exposed to an interior cavity of the pressure vessel when the plug body is received within the port; and
   the capacitor is supported at the distal end.

3. The plug according to claim 2, wherein the gas density gauge includes a terminal block at the proximal end having a pair of terminals, each of the terminals is connected to one of the plates through a conductive path.

4. A pressure vessel assembly comprising:
   a pressure vessel including a vessel wall defining an interior cavity;
   a boss supported by the vessel wall and including a port to the interior cavity;
   a plug comprising a plug body received within the port;
   a gas density gauge supported by the plug body and comprising a parallel plate capacitor including a pair of plates having opposing surfaces that are separated by a distance across an open gap; and
   valving through which a gas may be injected into the interior cavity or discharged from the interior cavity,
   wherein:
   a first pathway extends from a first opening in a distal face of the plug body to the open gap;
   a second pathway extends from a second opening in the distal face to the valving; and
   the opposing surfaces and the gap are exposed to a gas within the interior cavity; and
   a capacitance of the capacitor is related to a density of the gas.

5. The assembly according to claim 4, wherein:
   the plug body includes a proximal end, and a distal end, which includes the distal face and is exposed to the interior cavity; and
   the capacitor is supported at the distal end.

6. The assembly according to claim 5, wherein the gas density gauge includes a terminal block at the proximal end having a pair of terminals, each of the terminals is connected to one of the plates.

7. The assembly according to claim 4, including capacitance measurement circuitry configured to generate a capacitance signal relating to the capacitance of the capacitor and to the density of the gas.

8. The assembly according to claim 7, wherein:
a first of the plates is connected to electrical ground; and
the capacitance measurement circuitry comprises a timer circuit coupled to a second of the plates and configured to output the capacitance signal having a frequency that is related to the capacitance.

9. The assembly according to claim 7, wherein the capacitance measurement circuitry includes a controller configured to:
determine the capacitance of the capacitor based on the capacitance signal;
calculate a dielectric constant of the gas based on the capacitance, a distance separating the opposing surfaces, a surface area of the opposing surfaces, and the permittivity of free space;
determine a density of the gas based on the dielectric constant and a relationship between the dielectric constant of the gas and the density of the gas; and
generate a signal representing a value that is related to the density of the gas.

10. A method of measuring a density of a gas within a pressure vessel, wherein:
the pressure vessel comprises:
a vessel wall defining an interior cavity;
a boss supported by the vessel wall and including a port to the interior cavity;
a plug comprising a plug body received within the port;
a gas density gauge supported by the plug body and comprising a parallel plate capacitor including a pair of plates that are separated by a distance across an open gap;
valving through which a gas may be injected into the interior cavity or discharged from the interior cavity;
a first pathway extends from a first opening in a distal face of the plug body to the open gap; and
a second pathway extends from a second opening in the distal face to the valving, the method comprising:
containing a gas within the interior cavity of the pressure vessel;
exposing the open gap to the interior cavity through the first pathway;
exposing the valving to the interior cavity through the second pathway; and
generating a capacitance signal indicating a capacitance of the capacitor using capacitance measurement circuitry,
wherein the capacitance signal is related to a density of the gas.

11. The method according to claim 10, including:
connecting a first of the plates to electrical ground;
connecting a second of the plates to a timer circuit of the capacitance measurement circuitry; and
generating the capacitance signal using the timer circuit, the capacitance signal having a frequency that is related to the capacitance.

12. The method according to claim 10, including processing steps performed using a controller including:
determining the capacitance of the capacitor based on the capacitance signal;
calculating a dielectric constant of the gas based on the capacitance, a distance separating the opposing surfaces, a surface area of the opposing surfaces, and the permittivity of free space;
determining a density of the gas based on the dielectric constant and a relationship between the dielectric constant of the gas and the density of the gas; and
generating a signal representing a value that is related to the density of the gas.

13. The method according to claim 10, wherein:
the plug body includes a proximal end, and a distal end, which is exposed to the interior cavity; and
the parallel plate capacitor is supported at the distal end.

14. The method according to claim 13, wherein the gas density gauge includes a terminal block at the proximal end having a pair of terminals, each of the terminals is connected to one of the plates.

* * * * *